United States Patent
Tam et al.

(10) Patent No.: US 7,435,178 B1
(45) Date of Patent: Oct. 14, 2008

(54) TREMOLO BAR INPUT FOR A VIDEO GAME CONTROLLER

(75) Inventors: Johnnie Tam, San Jose, CA (US); Jamie Jien-Mei Yang, San Jose, CA (US); Theodor R. Lange, Mountain View, CA (US); John Yao, Shantou (CN)

(73) Assignee: Activision Publishing, Inc., Santa Monica, CA (US)

(*) Notice: Subject to any disclaimer, the term of this patent is extended or adjusted under 35 U.S.C. 154(b) by 0 days.

(21) Appl. No.: 11/403,659

(22) Filed: Apr. 12, 2006

(51) Int. Cl.
*A63F 9/24* (2006.01)
*A63F 13/02* (2006.01)
*A63F 13/08* (2006.01)
*G06F 17/00* (2006.01)
*G06F 3/01* (2006.01)
*G10H 1/32* (2006.01)

(52) U.S. Cl. ............................ 463/38; 463/7; 463/37; 463/46; 273/148 B; 273/148 R; 84/743

(58) Field of Classification Search .............. 84/600, 84/723, 743, 737, 739; 200/43.13, 43.18, 200/412; 16/262; 292/281; 267/150, 72; 74/526, 527; 463/46, 47, 7, 37, 38; 273/148 B, 273/148 R
See application file for complete search history.

(56) References Cited

U.S. PATENT DOCUMENTS

| | | | | |
|---|---|---|---|---|
| 3,555,156 A | * | 1/1971 | Gasser | 514/224.8 |
| 3,742,114 A | * | 6/1973 | Barkan | 84/740 |
| 4,177,705 A | * | 12/1979 | Evangelista | 84/722 |
| RE31,019 E | * | 8/1982 | Evangelista | 84/702 |
| 4,387,621 A | * | 6/1983 | Franzmann | 84/735 |
| 4,490,710 A | * | 12/1984 | Kopsho et al. | 338/128 |
| 4,572,049 A | | 2/1986 | Tanaka et al. | |
| 4,580,479 A | * | 4/1986 | Bonanno | 84/626 |
| 4,608,906 A | | 9/1986 | Takabayashi | |
| 4,632,004 A | | 12/1986 | Steinberger | |
| 4,632,005 A | | 12/1986 | Steinberger | |
| 4,648,304 A | | 3/1987 | Hoshino et al. | |
| 4,656,915 A | | 4/1987 | Osuga | |
| 4,658,690 A | * | 4/1987 | Aitken et al. | 84/629 |
| 4,763,555 A | | 8/1988 | Minakuchi et al. | |

(Continued)

FOREIGN PATENT DOCUMENTS

JP     2000126460 A   *   5/2000

(Continued)

OTHER PUBLICATIONS

Steven Tan. Declaration of Steven Tan in Support of Motion for Preliminary Injunction. Oct. 30, 2006. Provided by Oswald & Yap, Attorneys for Defendants.*

*Primary Examiner*—Lincoln Donovan
*Assistant Examiner*—Andrew Millikin
(74) *Attorney, Agent, or Firm*—Christie, Parker & Hale, LLP (57) ABSTRACT

A video game controller and a method of operating the controller are provided. The controller includes: a guitar-shaped housing comprising a body portion and a neck portion; a console interface for coupling with a game console; a tremolo arm extending from the body portion of the housing, said tremolo arm being rotatable about a first axis; and an angular detector coupled to the console interface for detecting angular rotation of the tremolo arm.

24 Claims, 5 Drawing Sheets

U.S. PATENT DOCUMENTS

| | | | |
|---|---|---|---|
| 4,794,838 A * | 1/1989 | Corrigau, III | 84/600 |
| 4,796,505 A | 1/1989 | Takeuchi | |
| 4,811,646 A | 3/1989 | Hoshino | |
| 4,932,302 A | 6/1990 | Saijo | |
| 4,974,486 A * | 12/1990 | Wallace | 84/609 |
| 5,046,393 A | 9/1991 | Xenidis | |
| 5,074,182 A * | 12/1991 | Capps et al. | 84/609 |
| 5,095,799 A * | 3/1992 | Wallace et al. | 84/609 |
| 5,121,668 A * | 6/1992 | Segan et al. | 84/646 |
| 5,413,019 A | 5/1995 | Blanda, Jr. | |
| 5,522,298 A | 6/1996 | Schaller et al. | |
| 5,631,435 A * | 5/1997 | Hutmacher | 84/739 |
| 5,641,923 A * | 6/1997 | Merski | 84/313 |
| 5,670,729 A | 9/1997 | Miller et al. | |
| 6,225,547 B1 * | 5/2001 | Toyama et al. | 84/611 |
| 6,252,153 B1 * | 6/2001 | Toyama | 84/634 |
| 6,342,665 B1 * | 1/2002 | Okita et al. | 84/609 |
| 6,347,998 B1 * | 2/2002 | Yoshitomi et al. | 463/42 |
| 6,390,923 B1 * | 5/2002 | Yoshitomi et al. | 463/43 |
| 6,444,887 B1 * | 9/2002 | Hiraoka et al. | 84/600 |
| 6,811,491 B1 * | 11/2004 | Levenberg et al. | 463/47 |
| 7,009,096 B2 | 3/2006 | Hirayama | |
| 7,044,857 B1 * | 5/2006 | Klitsner et al. | 463/35 |
| 7,049,504 B1 * | 5/2006 | Galoyan | 84/739 |
| 7,151,214 B2 * | 12/2006 | Barry | 84/600 |
| 2005/0235813 A1 * | 10/2005 | Barry | 84/723 |
| 2007/0232374 A1 * | 10/2007 | Lopiccolo et al. | 463/7 |
| 2007/0234885 A1 * | 10/2007 | Schmidt et al. | 84/722 |

FOREIGN PATENT DOCUMENTS

WO    WO 2005104089 A  * 11/2005

* cited by examiner

TREMOLO BAR INPUT FOR A VIDEO GAME CONTROLLER

BACKGROUND

Video game systems have become extremely popular in recent years, particularly the systems designed for home use. These video game systems typically include a console containing a power supply, CPU, and software for operating the console. The console typically includes an interface for reading a storage medium (e.g., a CD-ROM) containing the software for a particular game, a video interface for coupling with a display, and one or more controller interfaces for coupling with one or more game controllers. Over the years, different game controllers have been developed which enable a user to interact with the video games by manipulating the various inputs provided on the controller. Typically, the game console will be sold bundled with a generic controller for use with the majority of games compatible with that console. This generic controller may include several directional control buttons and several multi-purpose buttons. These buttons may operate as simple electrical switches indicating one of two states (e.g., pressed or not pressed) or may communicate an analog signal indicating a variety of states (e.g., how far a joystick is moved from center).

In some cases, specialized controllers for particular games or particular types of games have been developed in order to provide an increased sense a realism for the user. For example, one controller for use with driving simulation games includes a steering wheel, a shifter, and foot-operated pedals. Another controller for use with first person shooter games is shaped like a gun and includes a trigger for controlling the firing of a weapon on screen. These video game controllers must be entertaining to use, while being sufficiently durable so as to survive extended use. However, because these specialized controllers are only used with a limited number of game titles, the controllers cannot be prohibitively expensive to make.

The guitar is a very popular musical instrument, particularly among young adults, who are also a prime demographic for video games. Electric guitars utilize electromagnetic pickups, which sense the vibrations of the guitar strings electronically and route an electronic signal to an amplifier and speaker. Some electric guitars include a tremolo arm (sometimes referred to as whammy bars or vibrato bars) to alter the sound of the guitar. These tremolo arms are attached to the bridge and/or tailpiece of an electric guitar to enable the player to quickly vary the tension of the strings temporarily, thereby changing the pitch to create a vibrato, portamento, or pitch bend effect.

Accordingly, it would be desirable to provide a video game controller that simulates the operation of a guitar while being realistic, entertaining, durable, and relatively inexpensive to manufacture.

SUMMARY

In accordance with the present invention, a video game controller is provided. The video game controller includes: a guitar-shaped housing comprising a body portion and a neck portion; a console interface for coupling with a game console; a tremolo arm extending from the body portion of the housing, said tremolo arm being rotatable about a first axis; and an angular detector coupled to the console interface for detecting angular rotation of the tremolo arm.

In accordance with other embodiments, a video game controller includes: a guitar-shaped housing comprising a body portion and a neck portion; a console interface for coupling with a game console; a tremolo arm extending from the body portion of the housing, said tremolo arm being rotatable about a first axis; and an angular detection means coupled to the console interface for detecting angular rotation of the tremolo arm.

In accordance with other embodiments, a method of operating a video game controller having a guitar-shaped housing is provided. The method includes: detecting a strum by a user on a strum interface of the input device; transmitting a first signal to a game console, said first signal corresponding to the strum; detecting an angular position of a tremolo arm extending from a body portion of the housing, said tremolo arm being rotatable about a first axis; and transmitting a second signal to the game console, said second signal corresponding to the detected angular position of the tremolo arm.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Figure 1:
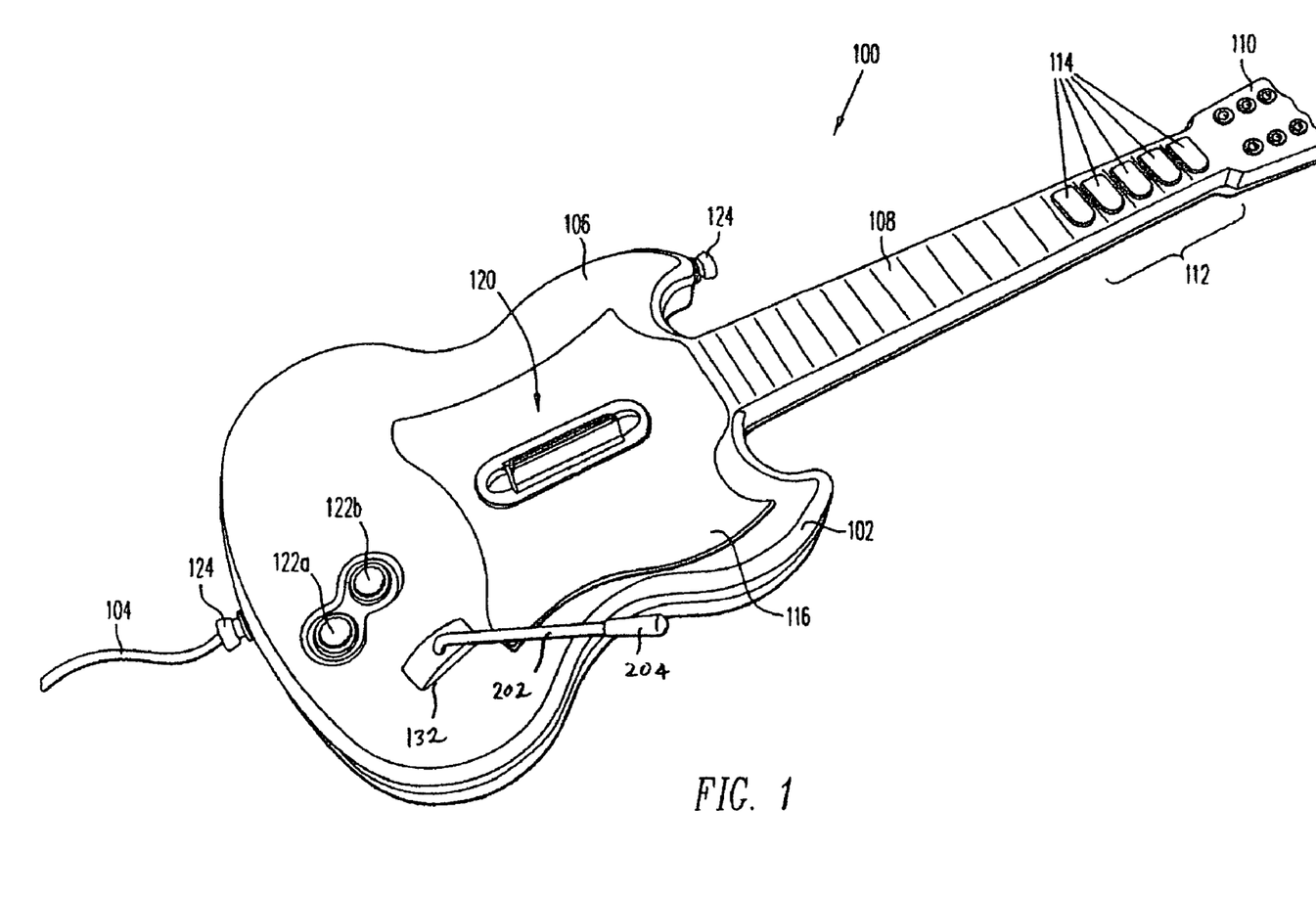
FIG. 1 is a perspective view of a video game controller in a string instrument-shaped housing, in accordance with embodiments of the present invention.

FIG. 1 is a perspective view of a video game controller in a guitar-shaped housing, in accordance with embodiments of the present invention. In this embodiment, the game controller 100 comprises a guitar-shaped housing 102 having a cord 104 for connection with a video game console (not shown). The housing 102 may come in a variety of shapes, but in this embodiment is styled after the SG guitar by Gibson USA.

The housing 102 includes a body portion 106, a neck portion 108, and a head portion 110. The body portion 106 comprises a pickguard 116, a strum interface 120, a tremolo bar 202, and a pair of control buttons 122a-122b. The control buttons 122a-122b may correspond to "Start" and "Select" for controlling the operation of a video game. A pair of strap buttons 124 may be provided for connection with a strap (not shown) for supporting the controller 100 from a user's neck.

The neck portion 108 comprises a fretboard interface 112 including a plurality of fret buttons 114 (five buttons 114 are provided in the illustrated embodiment).

Embodiments of the game controller 100 may be utilized in conjunction with any of a variety of video game systems. In one embodiment, the game controller 100 is configured for use with the PlayStation 2 video game console by Sony Computer Entertainment America, Inc.

Figure 5:
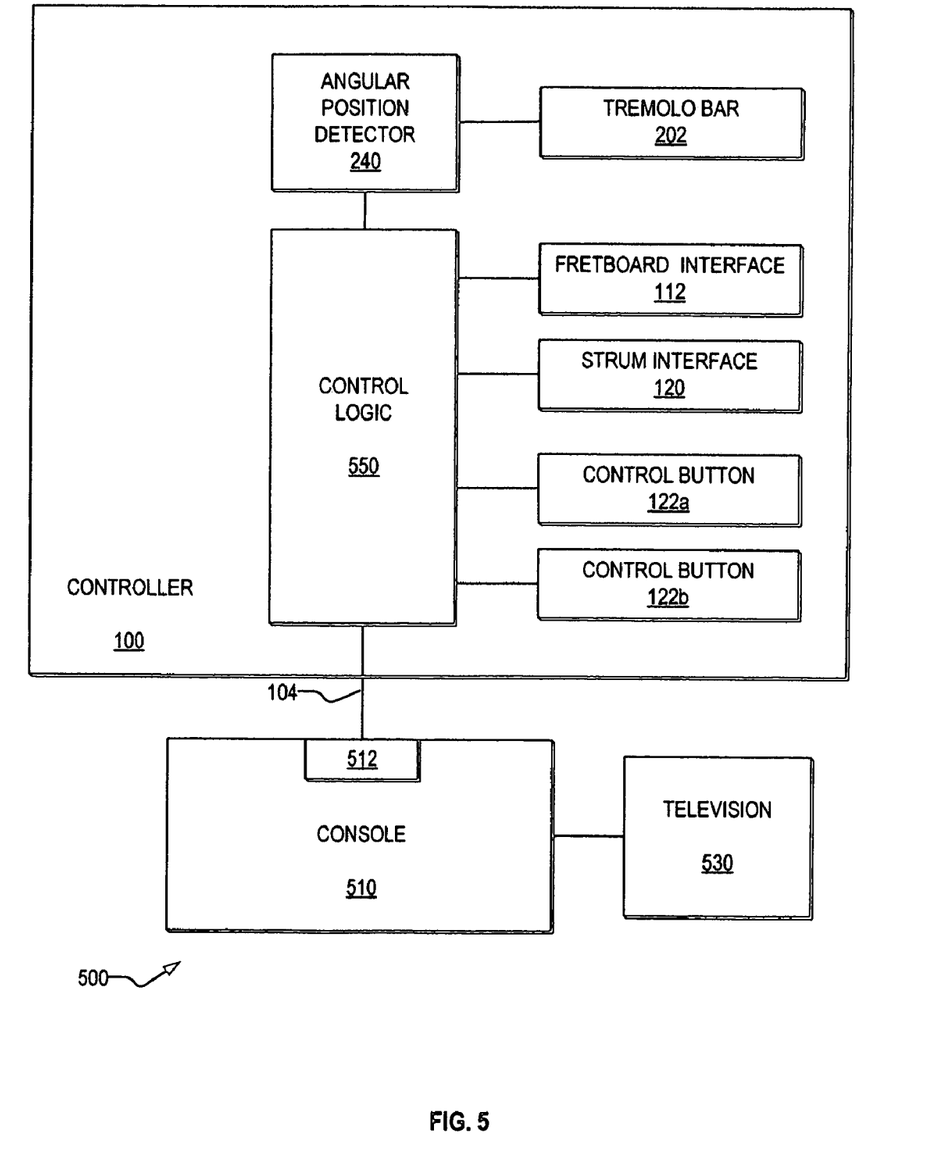
FIG. 5 is a block diagram of the video system, in accordance with embodiments of the present invention.

FIG. 5 is a block diagram of a video game system 500, in accordance with embodiments of the present invention. In this embodiment, the cord 104 terminates at a standard console connector (not shown) which is removably couplable with a controller port 512 on the PlayStation 2 video game console 510. Control logic 550 is provided in the game controller 100 for generating control signals to be transmitted to the video game console 510 in response to detection of a user's interaction with the fretboard interface 112, the strum interface 120, the control buttons 122a-122b, and the tremolo arm 130. The connector, the control logic 550, and the signals transmitted by the game controller 100 to the game console 510 via the cord 104 may be defined by standards established by the video game console manufacturer. The video game console 510, in turn, includes audio and video outputs for connection with a television 530 or other display. Typically, the display will include both a video display and an audio output, such as speakers. In some cases, the audio output will be provided by a separate sound system.

In contrast with actual guitars, the guitar controller 100 does not include strings. Instead, the musician's fingering of the strings on the fretboard is simulated by the pressing of the fret buttons 114 and the strumming of the strings is simulated by the strumming of the strum interface 120. A suitable guitar controller 100 is described in greater detail in co-pending patent application entitled, "STRUM INPUT FOR A VIDEO GAME CONTROLLER", by Jamie J. Yang and Johnnie Tam, filed on Apr. 12, 2006, the contents of which are incorporated herein in its entirety.

Figure 2:
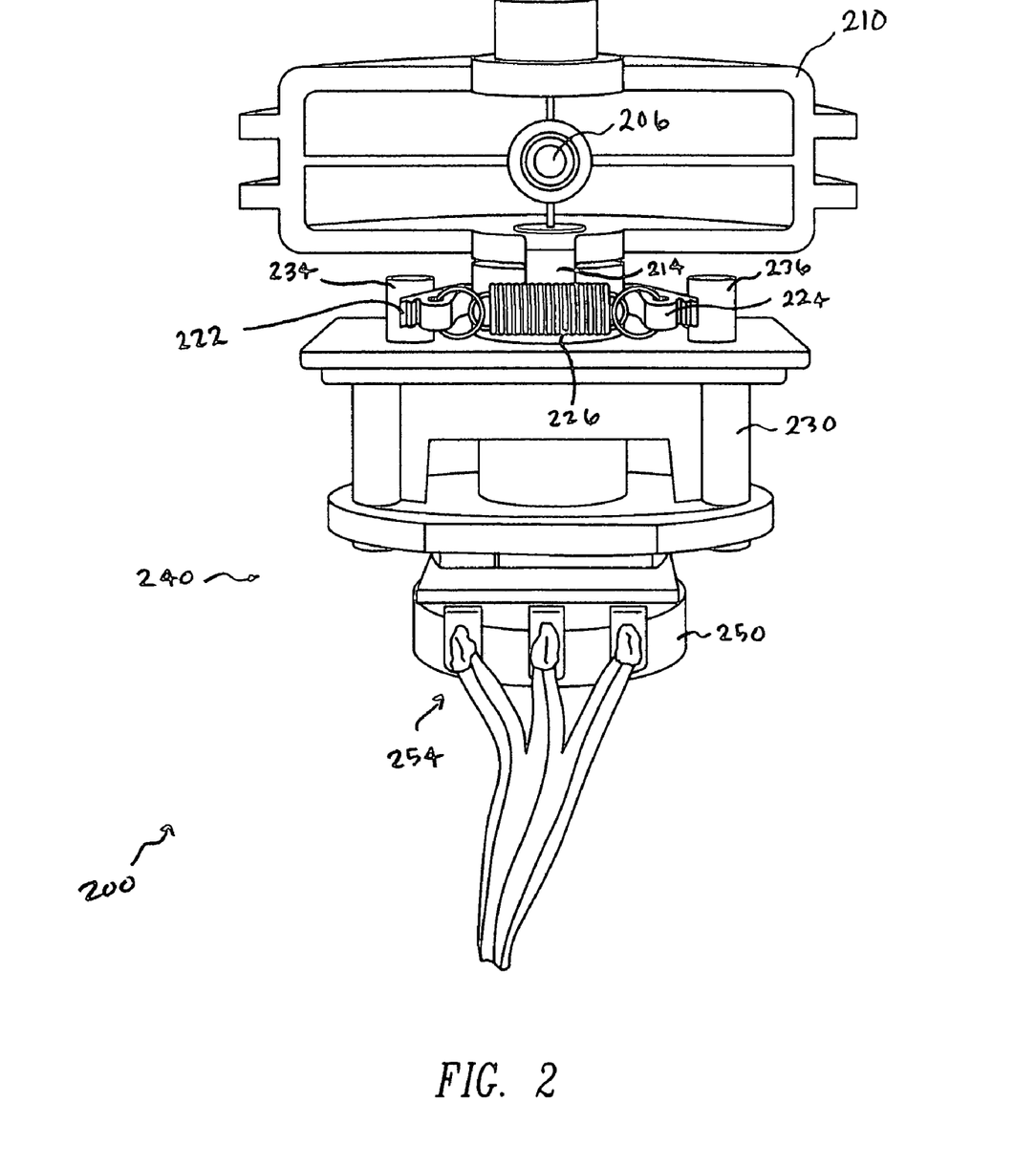
FIG. 2 is a bottom view of a tremolo arm assembly, in accordance with embodiments of the present invention.
Figure 3:
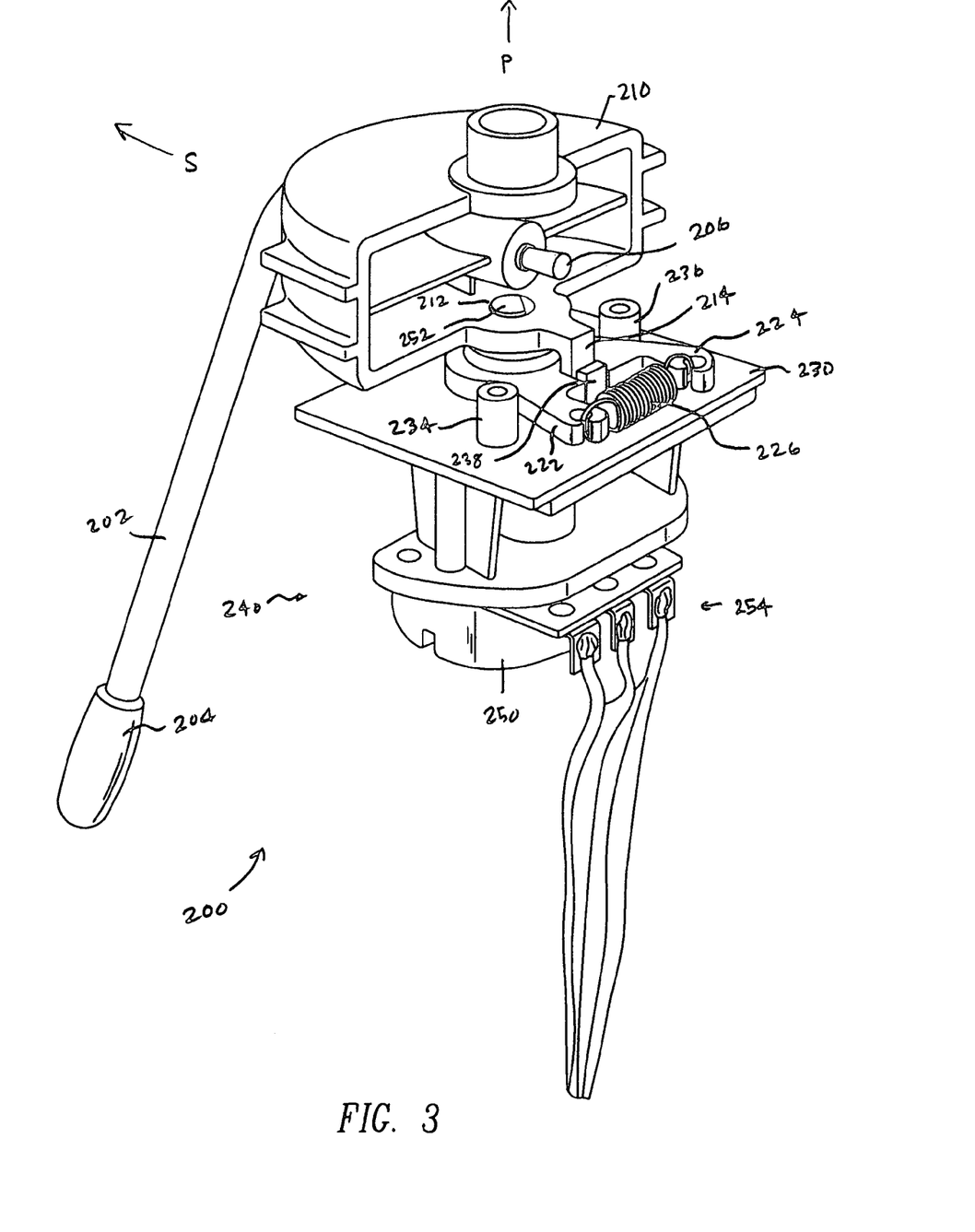
FIG. 3 is a bottom perspective view of the tremolo arm assembly, in accordance with embodiments of the present invention.
Figure 4:
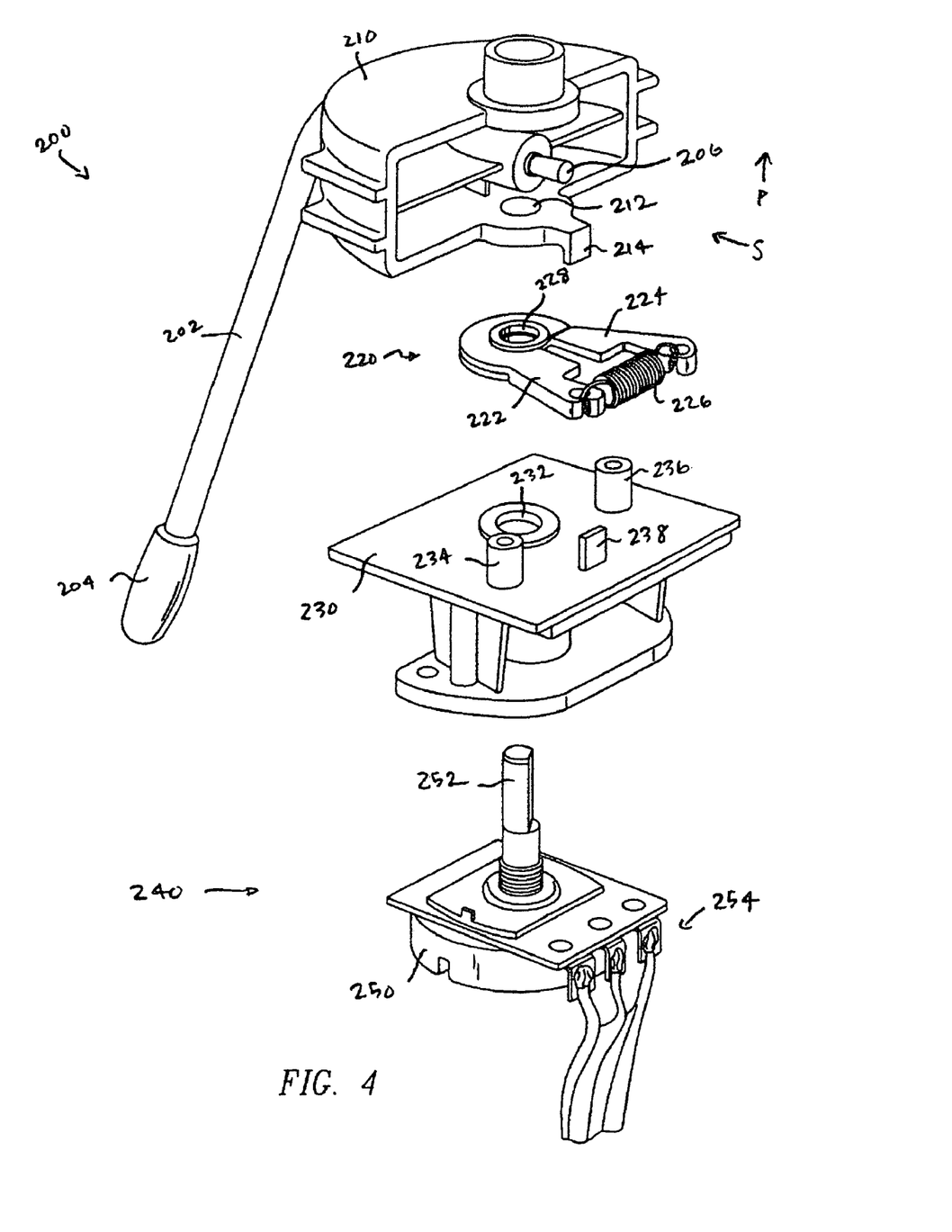
FIG. 4 is an exploded view of the tremolo arm assembly, in accordance with embodiments of the present invention.

FIG. 2 is a bottom view of a tremolo arm assembly 200, in accordance with embodiments of the present invention. FIG. 3 is a bottom perspective view of the tremolo arm assembly 200, and FIG. 4 is an exploded view of the tremolo arm assembly 200.

The tremolo arm assembly 200 comprises a tremolo bar 202 mounted to a semicircular base 210. The tremolo bar 202 and a portion of the semicircular base 210 extend through an opening 132 in the body portion 106 of the controller 100. The distal end of the tremolo bar 202 extending out of the body portion 106 is covered with a rubber tip 204 to improve the ease with which the user may grip and manipulate the tremolo bar 202.

The tremolo arm assembly 200 further comprises an angular position detector 240. In this embodiment, the angular detector 240 comprises a dial-control potentiometer 250 having a shaft 252 and three output leads 254. A frame 230 has an opening 232 which receives the shaft 252. A return assembly 220 comprises a pair of arms 222, 224, which include openings 228 through which the shaft 252 is received. Finally, the distal end of the shaft 252 is coupled to an opening 212 in the semicircular base 210 such that rotation of the base 210 about the primary axis P causes the shaft 252 to rotate together with the base 210.

The angular position of the tremolo bar base 210 about the primary axis P is detected by the angular detector 240. In particular, rotation of the shaft 252 effects a change in the resistance of the potentiometer 250. In this embodiment, a power supply in the video game console 510 supplies a voltage to the potentiometer 250 via the cord 104. The angular position of the shaft 252 determines the resistance of the potentiometer 250, thereby altering the current through the circuit. The video game console 510 includes an analog-to-digital converter to convert the analog signal from the potentiometer 250 into a digital signal which can be processed by the control circuitry of the video game console 510.

In accordance with other embodiments, the detection of the angular position of the tremolo arm assembly 200 may be accomplished in other ways. For example, the analog-to-digital converter may be provided in the controller 100 so that the controller 100 provides digital signals to the video game console 510 corresponding to the angular position of the tremolo arm base 210. In yet other embodiments, the angular position may be detected using mechanisms other than a potentiometer. For example, digital position sensors, such as optical sensors, may be used to detect the position of the tremolo arm base 210. These optical sensors can provide an indication of angular position and/or angular velocity with a high level of granularity, similar to an analog potentiometer-based detector but with increased accuracy. Thus, the angular position of the tremolo arm base 210 about the primary axis P can be both detected digitally and communicated digitally to the video game console 510.

The return assembly 220 works in conjunction with the frame 230 to limit the range of motion of the tremolo bar 202 and to provide a return force so as to return the tremolo bar 202 to the default position when moved by the user. In addition, the return assembly 220 provides resistance to the rotation of the tremolo bar 202 so as to better simulate the actual operation of a tremolo arm in an electric guitar.

In this embodiment, the return assembly 220 comprises a first arm 222, a second arm 224, and a spring 226. The first and second arms 222, 224 are aligned to provide an opening 228 through which the potentiometer shaft 252 is received. The spring 226 connects the distal ends of the first and second arms 222, 224.

The frame 230 includes a tab 238 which is received between the arms 222, 224 and a pair of projections 234, 236 which are configured to limit the movement of the arms 222, 224. The base 210 includes a flange 214, which is also received between the arms 222, 224 adjacent the tab 238 to set the default position of the arms 222, 224.

When the tremolo arm 202 is rotated about the primary axis P, the flange 214 presses against one of the arms 222, 224 (e.g., first arm 222) so as to cause the arm to rotate about the primary axis P as well. As described above, the spring 226 connects the distal ends of the arms 222, 224. However, as the first arm 222 rotates, the second arm 224 is prevented from rotating with the first arm 222 by the tab 238. Thus, the spring 226 will expand as the distal ends of the arms 222, 224 separate by an increasing distance. This provides a counter-force against the rotation of the tremolo bar 202 by the user, so as to provide the user with a sense of resistance to the movement. This simulates the resistance provided when a musician operates a tremolo arm in an actual guitar in order to vary the tension in the strings. The user will be able to continue to rotate the tremolo arm 202 until the first arm 222 contacts the first projection 234. The first projection 234 limits the extent to which the first arm 222 may rotate, thereby limiting the range of rotation for the tremolo arm 202.

If the user holds the tremolo arm 202 in the fully rotated position, the spring 226 will continue to apply a return force urging the tremolo arm 202 back into the default position, as shown in FIGS. 3-4. Once the user releases the tremolo arm 202, the spring 226 will contract to bring the distal ends of the arms 222, 224 together, thereby returning the arm 202 to the default position.

Similarly, if the tremolo arm 202 is rotated in the opposite direction, the second arm 224 will rotate until the second arm 224 contacts the second projection 236, and when the tremolo arm 202 is released, the spring 226 will return the arm 202 to the default position.

In the illustrated embodiment, the tremolo bar 202 has a proximal end 206 which is rotatably mounted to the base 210 so that the tremolo bar 202 may be freely rotated about the axis defined by the proximal end 206 (shown in FIGS. 3-4 as secondary axis S). In this embodiment, the rotation of the tremolo bar 202 about the proximal end axis is not detected by the controller 100 and therefore does not cause a control signal to be transmitted to the video game console 510. Only rotation about the primary axis P is detected by the controller 100 and communicated to the video game console 510. Thus, the rotation about the proximal end axis has no effect on gameplay. This is similar to the operation of a tremolo arm in an actual electric guitar. This design enables the tremolo arm to be adjusted to the most comfortable position for use by the user and to be rotated out of the way so as not to interfere with strumming. This also enables the user to operate the tremolo arm with an increased visual flourish by moving the tremolo arm about in a dramatic fashion. If the tremolo arm was constrained to movement about a single axis, the user would be much more limited in how the tremolo arm could be manipulated.

In operation, the controller 100 will typically be used in conjunction with a compatible video game running on the video game console. This game will generally provide cues to the user to indicate when and how the user should interact with the controller 100. For example, the video game software running on the console may cause the display to depict colors and/or shapes to indicate which fret buttons 114 to hold down while strumming on the strum interface 120, and the movement of these colors and/or shapes on the display will indicate the timing of the strumming. Points or other incentives are provided each time the user holds down the appropriate fret button 114 while strumming on the strum interface 120 at the appropriate time.

At certain points during the game, the display may indicate to the user that after strumming the strum interface 120, the user should manipulate the tremolo bar 202. When one or more fret buttons 114 are held down and the strum interface 120 is strummed, the software will generate a note or chord to be played by the audio system (e.g., the television 530). Then, when the tremolo arm 202 is rotated about the primary axis P, the software will modulate the pitch of the note or chord being played.

The tremolo arm 202 may be manipulated in a variety of ways to produce a modified pitch. In contrast with a typical controller button, which provides a binary "on/off" signal, the angular detector 240 is configured to detect a plurality of different positions of the tremolo bar 202. As a result, the extent and speed with which the tremolo bar 202 is rotated can be used to determine nature of the sound modulation. For example, the extent to which the tremolo bar 202 is rotated may determine the extent to which the pitch of the sound is varied, such that a small movement of the tremolo arm 202 would result in a small change in pitch, while a large movement of the tremolo arm 202 would result in a large change in pitch. In addition, the speed with which the tremolo bar 202 is rotated can be used to control the modulation of sound. For example, if the tremolo bar 202 is quickly moved to the fully rotated position (e.g., until the arm 222 contacts the projection 234), the change in pitch will be sudden, and if the tremolo bar 202 is slowly moved to the fully rotated position, the change in pitch will be gradual.

In addition, the user's manipulation of the tremolo arm assembly 200 can be used to sustain the last note or chord played. The software may operate such that the user must rotate the tremolo bar 202 a certain distance or at a certain speed in order to maintain the sound and thereby score points.

Embodiments of the present invention may provide various advantages not provided by prior art systems. The controller can provide a more realistic hardware interface to video game software running on the video game console. For example, the use of the tremolo arm assembly 200 enables an analog detection of movement of the tremolo bar 202. The detection of both the extent of rotation and speed of rotation can be used to produce differing results in the videogame. This type of rotational and velocity detection would normally not be detectable using a standard binary switch.

While the invention has been described in terms of particular embodiments and illustrative figures, those of ordinary skill in the art will recognize that the invention is not limited to the embodiments or figures described. For example, in the embodiments described above, the movement of the tremolo arm 202 is only detected about a single axis. In other embodiments, movement of the tremolo arm 202 in other directions or about other axes may be detected and used by the video game software to modulate or otherwise control the sound being produced. In addition, the precise shape, size, and arrangement of the tremolo arm interface may vary.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A video game controller comprising:
    a guitar-shaped housing comprising a body portion and a neck portion;
    a console interface for coupling with a game console;
    an arm assembly comprising a bar extending from a base, the base including at least a semicircular part, the bar and a portion of the base about the extending portion of the bar extending from an opening in the body portion, said bar being rotatable about a first axis, the first axis being parallel to a surface of the body portion and said arm being rotatable about a second axis, the second axis being normal to the surface of the body portion; and
    an angular detector coupled to the console interface, said angular detector for detecting angular rotation of the bar about the first axis.

2. The video game controller of claim 1, wherein:
    said angular detector comprises a potentiometer for generating an analog signal corresponding to an angular position of the bar about the first axis.

3. The video game controller of claim 1, wherein:
    said angular detector comprises an optical sensor for generating a signal indicating a plurality of angular positions of the bar about the first axis.

4. The video game controller of claim 1, further comprising:
    a strum input provided on the body portion of the housing and coupled to the console interface, said strum input for detecting strumming motion by a user; and
    a fretboard input provided on the neck portion of the housing and coupled to the console interface, said fretboard input for detecting fretboard fingering by the user.

5. The video game controller of claim 4, wherein:
the neck portion of the housing extends along a neck axis; and
the strum input comprises a flange configured to rotate about a strum axis substantially parallel to the neck axis.

6. The video game controller of claim 4, wherein:
the fretboard input comprises at least five buttons.

7. The game controller of claim 1, wherein the console interface comprises a control logic.

8. The game controller of claim 1, wherein the angular detector is configured to provide a digital signal indicative of the angular rotation of the bar.

9. The game controller of claim 8, wherein the angular detector comprises a digital position sensor.

10. The game controller of claim 1, wherein the angular detector is configured to provide an analog signal indicative of the angular rotation of the bar.

11. A video game controller, comprising:
a guitar-shaped housing comprising a body portion and a neck portion;
a console interface for coupling with a game console;
an arm assembly including a bar mounted to a semicircular base, a portion of the semicircular base extending through an opening in the body portion of the housing, said bar rotatable about a first axis, the first axis being parallel to a surface of the body portion;
said bar rotatable about a second axis, the second axis being normal to the surface of the body portion; and
an angular detection means, coupled to the console interface, for detecting angular rotation of the bar.

12. The video game controller of claim 11, wherein:
said angular detection means comprises a potentiometer for generating an analog signal corresponding to an angular position of the bar about the first axis.

13. The video game controller of claim 11, wherein:
said angular detection means comprises an optical sensor for generating a signal indicating a plurality of angular positions of the bar about the first axis.

14. The video game controller of claim 11, further comprising:
a strum input provided on the body portion of the housing and coupled to the console interface, said strum input for detecting strumming motion by a user; and
a fretboard input provided on the neck portion of the housing and coupled to the console interface, said fretboard input for detecting fretboard fingering by the user.

15. The video game controller of claim 14, wherein:
the neck portion of the housing extends along a neck axis; and
the strum input comprises a flange configured to rotate about a strum axis substantially parallel to the neck axis.

16. The video game controller of claim 11, wherein the console interface comprises a control logic.

17. Apparatus for video game play, comprising:
a video game controller comprising:
a guitar-shaped housing comprising a body portion and a neck portion with a plurality of buttons on the neck portion;
a rotatable base rotatably coupled along a first axis to the body portion of the guitar-shaped housing, a portion of the rotatable base extending through an opening in the guitar-shaped housing;
a bar extending from and rotatably coupled along a second axis to the rotatable base, the bar extending from the portion of the rotatable base extending through the opening in the guitar-shaped housing;
a spring to bias the rotatable base to a default position;
a detector for detecting position of the bar; and
control logic for generating signals for transmission to a video game console in response to a user's interaction with the buttons on the neck portion and the bar.

18. The apparatus of claim 17 further comprising the game console, the game console configured to run a video game for providing cues to the user to indicate interaction with the video game controller and to provide points for interaction in accordance with the cues.

19. The game controller of claim 17, further comprising:
a flange on the rotatable base; and
a first arm coupled to the spring, the first arm positioned in a travel path of the flange upon rotation of the rotatable base, the first arm rotatable about the first axis.

20. The game controller of claim 19, further comprising:
a second arm positioned in the travel path of the flange upon rotation of the rotatable base and coupled to the spring, the second arm rotatable about the first axis; and
a frame mounted to the body portion, the frame having one or more protrusions, the one or more protrusions positioned to limit the range of motion of at least one of the first arm and the second arm.

21. The game controller of claim 20:
wherein the bar comprises a proximal section having a proximal end and a distal section having a distal end, the proximal end being mounted to the rotatable base; and
wherein the bar is shaped such that the proximal section makes an obtuse angle with the distal section.

22. The game controller of claim 21, wherein:
the proximal section comprises a cylindrical rod shape having a first diameter;
the distal section comprises a cylindrical rod shape having a second diameter;
the second diameter is greater than or equal to the first diameter;
the rotatable base includes a cylindrical opening configured to receive the proximal end of the bar, the second axis being located along the center line of the cylindrical opening; and
the bar is rotatably mounted within the cylindrical opening.

23. The game controller of claim 22, wherein the bar is configured to rotate 360 degrees within the cylindrical opening.

24. A video game controller, comprising:
a guitar-shaped housing;
a semicircular base extending through an opening in the housing;
a bar extending from the semicircular base, the arm rotatably coupled to the housing so as to be rotatable about a primary axis and a secondary axis;
means for detecting angular position of the bar along the primary axis;
control logic for generating signals to be transmitted to a video game console indicative of angular position of the bar along the primary axis; and
means for providing a counterforce against rotation of the bar about the primary axis.

* * * * *